United States Patent [19]

Nishiyama

[11] 4,427,295
[45] Jan. 24, 1984

[54] MEASURING APPARATUS
[75] Inventor: Keizo Nishiyama, Yokohama, Japan
[73] Assignee: Canon Kabushiki Kaisha, Tokyo, Japan
[21] Appl. No.: 336,839
[22] Filed: Jan. 4, 1982

Related U.S. Application Data
[63] Continuation of Ser. No. 969,883, Dec. 15, 1978.

[30] Foreign Application Priority Data
Dec. 16, 1977 [JP] Japan .............................. 52-152062
[51] Int. Cl.³ ............................................. G01B 11/30
[52] U.S. Cl. ..................................... 356/371; 356/369
[58] Field of Search ................ 356/369, 371, 376, 431

[56] References Cited
U.S. PATENT DOCUMENTS 3,692,414  9/1972  Hosterman et al. ............... 356/376
3,885,875  5/1975  Rosenfeld et al. ................. 356/371
3,922,093  11/1975 Dandleker et al. ................. 356/431
3,975,102  8/1976  Rosenfeld et al. ................. 356/376
4,112,309  9/1978  Nakazawa et al. ................. 356/371

Primary Examiner—R. A. Rosenberger
Attorney, Agent, or Firm—Fitzpatrick, Cella, Harper & Scinto

[57] ABSTRACT

A measuring apparatus is disclosed in which a surface to be measured in scanned by a scanning beam essentially normally incident upon the surface and the angular deviation of the beam of light regularly reflected from the surface is detected to measure the flatness of the surface. When the surface to be measured is such one which includes a low reflective part on which diffraction and/or scatter of light take place, and a high reflective part which may be considered almost to be a mirror surface, the measurement of flatness thereof is very difficult or impossible to carry out. This is applied, for example, to a semiconductor silicon wafer having thereon patterns for IC, LSI and the like. To enable to measure the flatness of such surface, the measuring apparatus according to the present invention comprises means for varying the cross sectional area of the scanning beam to the extent in which the cross sectional area of the scanning beam may cover the low reflective part and at least a portion of the high reflective part.

5 Claims, 8 Drawing Figures

MEASURING APPARATUS

This is a continuation of applications Ser. No. 969,883, filed Dec. 15, 1978.

BACKGROUND OF THE INVENTION

1. Field of the Invention

The present invention relates to apparatus for measuring the flatness of a surface by scanning the surface with a scanning beam and detecting the angular deviation of the beam of light regularly reflected from the surface.

2. Description of the Prior Art

Hitherto, various types of measuring apparatus have been used to measure the flatness of a surface. Among them, interferometer using the phenomenon of interference of light and electrostatic capacity type of measuring apparatus making use of change of electrostatic capacity are most widely known in the art.

While the interferometer is able to give two-dimensional information regarding the flatness, it has such particular disadvantages that an extremely high accuracy is required for setting the surface to be measured and that measurement of unevenness of the surface and quantative measurement of the surface are very difficult to carry out. On the other hand, the capacity type of measuring apparatus has such disadvantages that adjustment of capacity is required every time the kind of material of the test subject is changed from one to another although the apparatus has a merit of giving information of thickness of the subject.

In order to eliminate the above described disadvantages, there has been proposed another type of measuring apparatus in which a surface to be measured is scanned by a scanning beam incident upon the surface at an incident angle essentially normal to the surface and the angular deviation of the beam of light regularly reflected from the surface is detected to know the flatness of the surface. The inclination of the surface in the scanning direction, that is, the value of primary differentiation is detected as a positional deviation on a position detector photoelectric element. A computation of the differential value by an electrical integration gives the desired flatness of the surface. A typical example of such type of flatness measuring apparatus is disclosed in U.S. Pat. No. 3,885,875 specification.

This type of measuring apparatus has, however, a particular disadvantage. When the surface to be measured is a surface containing pattern area as in the case of a wafer having thereon patterns and when the cross sectional area (or beam diameter) of the scanning beam remains unchanged for different pattern areas, the quantity of light reflected from the subject surface into the collimator lens becomes insufficient to carry out the measurement due to the loss of light by diffraction and/or scatter of the reflected light. This problem is effectively solved by the present invention.

SUMMARY OF THE INVENTION

Accordingly, it is a primary object of the invention to provide a flatness measuring apparatus which permits measurement of the flatness of such surface containing a low reflective part and a high reflective part using a scanning beam essentially normally incident upon the surface.

According to the present invention, this object is attained by providing the measuring apparatus with an optical element disposed between a light source and the surface to be measured and adapted for varying the cross sectional area of the scanning beam in accordance with the change of surface condition of the surface to be measured.

Other and further objects, features and advantages of the invention will appear more fully from the following description taken in connection with the accompanying drawings.

DESCRIPTION OF THE PREFERRED EMBODIMENTS

Figure 1:
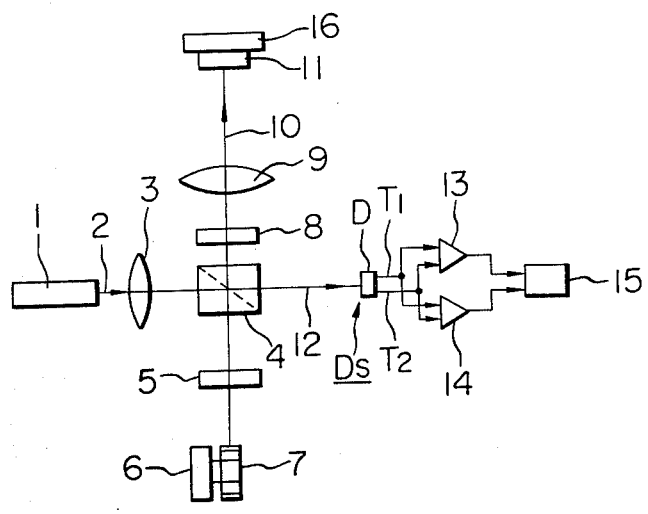
FIG. 1 shows an optical arrangement of measuring apparatus in accordance with the invention.

FIG. 1 shows an optical arrangement of flatness measuring apparatus in which the present invention is embodied. Designated by 1 is a laser generator which forms a parallel beam of light 2 linearly polarized and having a relatively small beam diameter. The beam 2 is focused at the equivalent focal point of a focusing lens 3, that is, on the respective reflecting surface of a rotary polygon mirror 7 which is rotated by a motor 6 at a constant speed. 4 is a polarization beam splitter which is provided to effectively use the quantity of light. The beam 2 set for S-polarization relative to the beam splitter 4 is totally reflected to a quarter wave length plate 5. After passing through the quarter wave length plate 5, the beam 2 is incident on the polygon mirror 7 by which the beam is reflected diverging from the reflection point lying on the optical axis. The divergent pencil of rays running radially from the reflection point (the center of divergence) forms a scanning beam. The scanning beam passes through again the quarter wave length plate 5 and is now P-polarized to pass through the polarization beam splitter 4 completely. After passing through another quarter wave length plate 8, the beam enters a collimator lens 9 at the focal point of which the polygon mirror 7 is located. The beam of light emerging from the collimator lens 9 forms a scanning beam 10 for parallel and unidimensional scanning the diameter of which is different from that of the beam 2. A surface to be measured 11 is nearly vertically scanned by the scanning beam 10. The beam reflected upon the surface 11 in a manner of regular reflection passes through again the collimator lens 9 and the quarter wave length plate, and becomes an S-polarized beam which is totally reflected by the polarization beam splitter 4 to form a converging beam 12. The converging beam 12 is incident upon the light receiving surface $D_s$ of a photoelectric element serving as a position detector D positioned at the equivalent focal point of the collimator lens 9.

Figure 2:
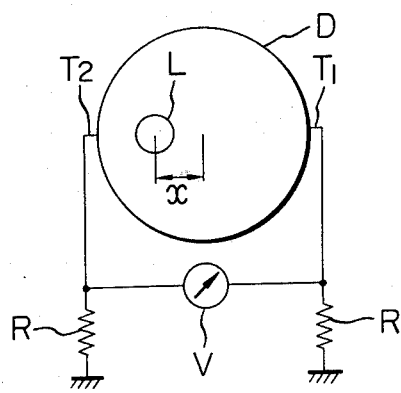
FIG. 2 is an explanatory view of the position detector used in the measuring apparatus.

The origin of coordinates set up on the light receiving surface $D_s$ is coincident with the equivalent focal point of the collimator lens 9. The position at which the beam 12 is incident on the light receiving surface $D_s$ of the position detector D correponds to the inclination in the scanning direction of the surface to be measured 11 relative to the scanning beam 10 which is in parallel with the optical axis, namely the primary differential of cross sectional shape in the scanning direction relative to the scanning time, $dz/dt$. Thus, the angular deviation of the regularly reflected light is detected as the amount of positional deviation x on the light receiving surface $D_s$ of the position detector. Thus, let f denote the focal length of the collimator lens 9. Then, $x=2f\, dz/dt$. As shown in FIG. 2, the position detector D has two output terminals $T_1$ and $T_2$. The difference between the two outputs makes an output 13 and the sum thereof an output 14 shown in FIG. 1. In order to compute the amount of deviation independently of the quantity of the incident light, there is obtained a divided output v, that is, $T_1-T_2/T_1+T_2$, thereby giving $v \propto 2f\, dz/dt$. An integrator 15 detects its analogue output, which gives: $a=(1/2f)\int v\, dt$. Also, the value of "peak to peak" is detected and using its digital output the flatness of the measured surface 11 is computed. To obtain the two-dimensional information of the surface 11, the movable table 16 on which the surface 11 is placed is driven in rotation about the optical axis or in movement in x and y directions.

The position detector D used in the FIG. 1 embodiment is shown in detail in FIG. 2. This position detector is of the type sold by United Detector Technology Company under the trade name "PIN SC/10". First and second terminals $T_1$ and $T_2$ thereof are connected to ground through resistors R and R respectively. Terminal voltage of each resistor R varies proportionally to the electromotive current of the respective terminals $T_1$, $T_2$ depending upon the amount of deviation x. Between the two terminals $T_1$ and $T_2$ there is provided a voltmeter V to obtain an output corresponding to the amount of deviation x then detected.

Such type of position detector photoelectric element can perform a linear detection operation only when a constant quantity of light is applied thereto. If the amount of light incident upon the position detector D is reduced to a level lower than the necessary constant level, then the position detector can no longer perform its function. In scanning the surface of a wafer or the like containing therein various patterns, some amount of loss of light is caused by diffraction of light at the pattern area and also by scatter of light on dirt or other foreign matter particle. Therefore, when the cross sectional area of the scanning beam always remains fixed for various sizes of such patterns, the quantity of reflected light toward the collimator lens 9 may be sometimes decreased for the reason mentioned above to such extent that the position detector D positioned at the equivalent focal point of the collimator lens 9 becomes impossible to work.

To solve the above described problem according to the invention, the lens 3 which forms, together with the collimator lens 9, an afocal system of the flatness measuring apparatus is so arranged as to be selectively variable in its focal length as well as its position along the optical axis. By suitably changing the focal length and the position along the optical axis of the lens 3 according to the surface condition of the surface to be scanned, the cross sectional area of the scanning beam (beam diameter) can be varied to increase the quantity of light received by the photoelectric element D. In this case, however, the following point should be taken into consideration. With a scanning beam of small cross sectional area it is allowed to measure the flatness in every small area of a surface to be measured. But, such scanning beam having small cross sectional area is more sensitive to noise such as pattern or dirt. On the other hand, a scanning beam of enlarged cross sectional area is less sensitive to such noise but no fine measurement of flatness is attainable with it. Since the scanning spot is enlarged, the measurement will result merely in an average flatness in the enlarged area. The present invention eliminates such disadvantage by enlarging the cross sectional area of the scanning beam to such extent that the enlarged area can cover not only the low reflective portion but also the high reflective portion of a surface to be measured. In this manner, the quantity of reflected light from the scanned area can be sufficiently increased to compensate the loss of the reflected light caused by diffraction of light at the pattern area and/or by scatter of light on dirt and other foreign matter particles. This method does not require increase of the brightness of the laser light source and therefore it has an advantage with respect to safety of laser as compared with such method involving power-up of the laser light source to compensate for the loss of the reflected light.

Figure 3:
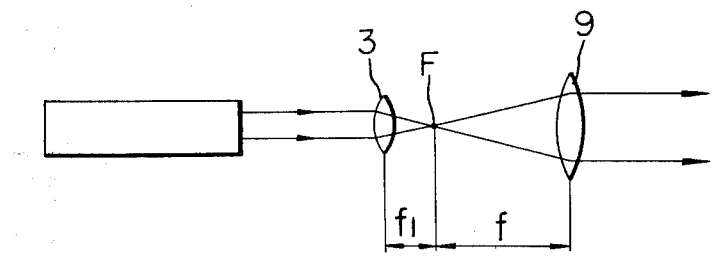
FIG. 3 shows an afocal system formed in accordance with the invention.
Figure 4:
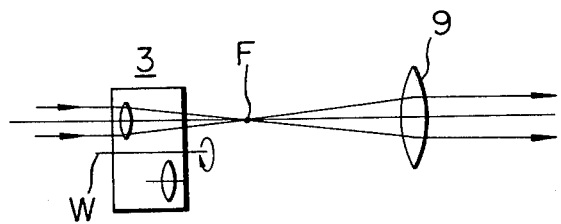
FIG. 4 illustrates an example of the afocal system in which a turret type lens system is used.
Figure 5:
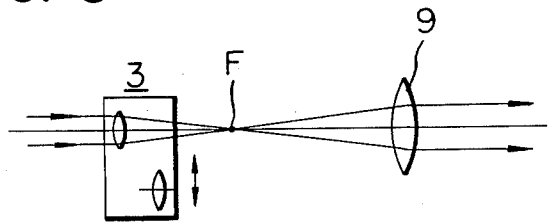
FIG. 5 illustrates another example in which a slide type lens system is used.

In FIG. 3, F denotes the position at which the polygon mirror 7 is located. When the focal length of the lens 3 is $f_1$ and that of the collimator lens 9 is f, the beam diameter of the beam 10 is $f/f_1$ times enlarged as compared with the diameter of the beam 2. This means that the beam 10 has a cross sectional area $(f/f_1)^2$ times larger than that of the beam 2. The lens 3 may be formed by using various types of lens system. For example, the lens 3 can be formed by employing such lens system comprising at least one lens which is movable along the optical axis so as to continuously change the focal length thereof while maintaining its imaging position unchanged. Other examples are illustrated in FIG. 4 and FIG. 5 in which the lens 3 is composed of lenses having different focal lengths. To form an afocal system and to change to focal length stepwise, the lens system is rotated about its rotation axis W (FIG. 4) or moved translationally (FIG. 5) so as to bring the respect one of the lenses in alignment with the optical axis.

The incident beam 10 having an enlarged beam diameter scans the subject surface 11 in a given direction along a straight line. At the same time, the subject surface 11 itself is also moved to obtain two-dimensional information thereof. When the surface 11 is of rectangular shape as in the case of chrome surface or the like, the subject surface is moved in a direction perpendicular to the scanning direction. When the subject surface is of circular form as in the case of wafer or the like, it is driven in rotation.

Figure 6:
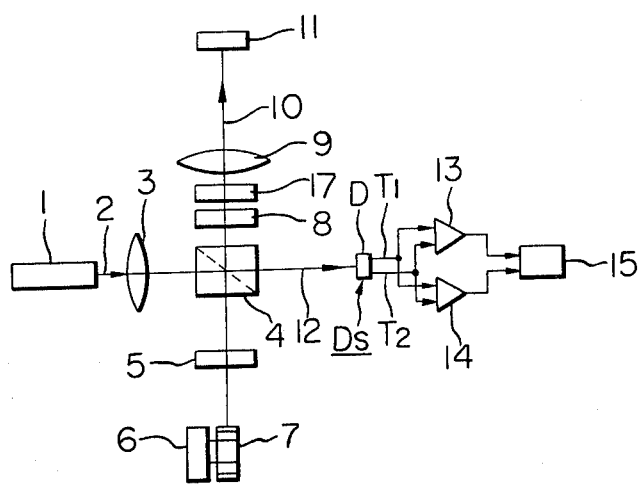
FIG. 6 is a view similar to FIG. 1 but showing the second embodiment of the invention in which the surface to be measured is stationarily placed.
Figure 7:
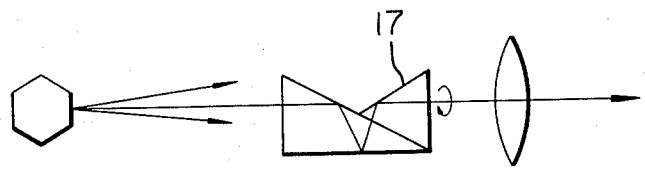
FIG. 7 is an explanatory view of image rotator.
Figure 8:
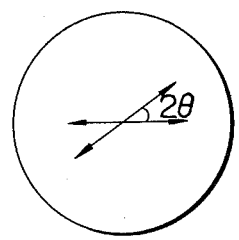
FIG. 8 is an explanatory view of the scanning direction being rotated on the surface to be measured.

FIG. 6 shows a modification of the above described embodiment in which an image rotator 17 is disposed between the polygon mirror 7 and the collimator lens 9. By rotating the image rotator 17, the linear scanning beam on the subject surface 11 is rotated in a plane normal to the optical axis. Therefore, the subject surface of circular shape such as wafer is allowed to be stationary. While, in FIG. 7, the rotation of image rotator 17 causes the scanning beam on the surface 11 to rotate, the beam of reflected light from the surface again passes through the image rotator 17 and therefore the direction of deviation of the reflected light on the position detector becomes constant. This allows the position detector to remain stationary. As seen from FIG. 8, when the image rotator 17 is rotated by θ, the scanning direction is rotated by 2θ within a plane normal to the optical axis.

When measurement of flatness is carried out for such wafer containing not only patterns but also scribe line used for scribing, it is recommendable that the scanning beam should have an enlarged cross sectional area large enough to cover also the scribe line. By doing so, the quantity of reflected light from the measured surface is increased accordingly and a good result of measurement is obtainable. In measuring the flatness of subject surface, in addition to the regularly reflected light, the above mentioned diffracted light and/or scattered light also may enter the collimator lens 9 as a noise light. But, such noise light is quantatively very small and may be considered to have only a negligibly small effect on the accuracy of measurement with the apparatus in accordance with the invention. Thus, the present invention enables broadening of the range in which measurement of flatness can be carried out.

While the invention has been particularly shown and described with reference to preferred embodiments thereof, it will be understood by those skilled in the art that the foregoing and other changes in form and details can be made therein without departing from the spirit and scope of the invention.

What I claim is:

1. A flatness measuring apparatus for measuring a one dimensional profile of a surface of a semiconductor silicon wafer or the like having integrated circuit patterns, large scale integrated circuit patterns or the like formed thereon, by detecting the absolute angular deviation of light regularly reflected from said surface in a scanning direction onto a position detecting photoelectric element, and by making an electric integration of the output of said photoelectric element, comprising:

a laser light source for generating a laser beam, a variable focal length focusing lens system for focusing the laser beam generated by said laser light source on a fixed focal point, the focal length of said focusing lens system being adjustable to accommodate changes in the surface condition of the surface to be measured, a polarization beam splitter for directing said laser beam emanating from said laser light source toward said focal point, a first quarter wavelength plate disposed in the optical path of said laser beam between said beam splitter and said focal point, a unidimensional scanning optical system disposed at said focal point for directing said laser beam therefrom, a second quarter wavelength plate for receiving said laser beam directed from said scanning optical system, a collimator lens for receiving the laser beam from said second quarter wavelength plate and for establishing in conjunction with said focusing lens system an afocal system to project a parallel scanning beam from the laser beam onto said surface at a substantially normal incident angle, the cross sectional area of said scanning beam on said surface being enlargeable to cover at least the size of any one of said patterns, in accordance with changes in the surface conditions of said surface, by changing the focal length of said focusing lens system, while maintaining said afocal system.

2. A flatness measuring apparatus as claimed in claim 1, wherein said scanning beam on said surface is enlargeable to cover at least a scribe line used for scribing.

3. A flatness measuring apparatus as claimed in claim 1, wherein said apparatus further comprises an image rotator disposed on the optical axis of said collimator lens and between said beam splitter and said collimator lens, and wherein said position detecting photoelectric element comprises a one-dimensional element disposed at the focal point of said collimator lens, whereby the surface to be measured and said position detecting photoelectric element are maintained at fixed positions irrespective of rotation, by the rotation of said image rotator, of the scanning beam on the surface to be measured.

4. A flatness measuring apparatus as claimed in claim 1, wherein said focusing lens system includes at least one lens movable in the direction of the optical axis of said lens system for changing the focal length of said focusing lens system.

5. A flatness measuring apparatus as claimed in claim 2, wherein said focusing lens system includes a plurality of different focal length lenses each of which may be brought into alignment with the optical axis of said lens system for changing the focal length of said focusing lens system.

* * * * *

UNITED STATES PATENT AND TRADEMARK OFFICE
CERTIFICATE OF CORRECTION

PATENT NO. : 4,427,295
DATED : January 24, 1984
INVENTOR(S) : KEIZO NISHIYAMA

It is certified that error appears in the above-identified patent and that said Letters Patent is hereby corrected as shown below:

Column 3

Line 21, change "oc" to $--\alpha--$.

Line 23, change "a = (1/2f)" to $--z = (1/2f)--$.

Column 4

Line 43, change "to" to --the--.

Column 6, line 41
Claim 5, line 2

Change "2" to --1--.

Signed and Sealed this

Eighth Day of May 1984

[SEAL]

Attest:

Attesting Officer

GERALD J. MOSSINGHOFF

Commissioner of Patents and Trademarks